United States Patent [19]

Henszey

[11] 4,366,832

[45] Jan. 4, 1983

[54] SELF-CLEANING VARIABLE PRESSURE REDUCING ELEMENT

[75] Inventor: Richard R. Henszey, Oconomowoc, Wis.

[73] Assignee: Sentry Equipment Corporation, Oconomowoc, Wis.

[21] Appl. No.: 225,843

[22] Filed: Jan. 16, 1981

[51] Int. Cl.³ .......................... F16K 1/52; F16K 47/04
[52] U.S. Cl. .................................... 137/244; 251/205; 251/122
[58] Field of Search ................ 251/122, 205; 137/244

[56] References Cited

U.S. PATENT DOCUMENTS

| | | | |
|---|---|---|---|
| 1,961,747 | 6/1934 | Ewart | 251/122 X |
| 2,725,212 | 11/1955 | Jensen | 251/122 |
| 3,365,166 | 1/1968 | Smith | 251/122 X |
| 4,099,703 | 7/1978 | Lush | 251/122 |

FOREIGN PATENT DOCUMENTS 55-60777  5/1980  Japan .................................. 251/122

OTHER PUBLICATIONS

Sentry Equipment Corp., Bulletin 1.10.1 RO5-79.

*Primary Examiner*—Arnold Rosenthal
*Attorney, Agent, or Firm*—Michael, Best & Friedrich

[57] ABSTRACT

The pressure reducing element includes an elongated body having an axially-extending, cylindrical bore including three stepped portions of increasing diameter. Pressure is regulated by a stepped cylindrical valve rod having an outer end located exteriorly of the body and a pressure regulating portion normally located inside the bore and including two pressuring regulation sections of increasing diameter. The valve rod is moved axially within the bore to adjust the outlet pressure by rotating a handle on the outer end of a spindle which is connected to the valve rod and threaded into a collar carried by a fixture mounted on the body for relative axial movement. The valve rod is urged toward an adjusted position by a compression spring encircling the exterior of the body with one end restrained against axial movement relative to the body and the other end bearing against a spring retainer carried by the fixture. If the element becomes plugged with foreign particles, the valve rod can be retracted, while in any adjusted position, by pulling on the handle which causes the spring to compress and permit sufficient travel of the valve rod to move the larger pressure regulating section into the next larger bore portion, thereby facilitating flushing of the particles from the element by system pressure.

11 Claims, 3 Drawing Figures

SELF-CLEANING VARIABLE PRESSURE REDUCING ELEMENT

BACKGROUND OF THE INVENTION

This invention relates to pressure reducing elements and, more particularly, to variable pressure reducing elements adapted for use in sampling systems for high pressure fluids.

In the operation of same high pressure fluid systems, such as steam generating systems for power plants, samples of the fluid are periodically analyzed for various properties and/or composition. The fluid being sampled often is at several thousand pounds pressure and this pressure must be reduced to a relatively low pressure, for example, 25 psi, prior to introduction into the analyzer. This pressure reduction desirably should be effected under laminar flow conditions in order to minimize disassociation of components in the fluid sample which can be caused by discontinuous pressure drops.

Valves including an orifice seat, such as needle valves, generally are not acceptable for this purpose because of a tendency to create turbulent flow and, more importantly, because the high velocity flow through the constricted area between the seat and the valve member causes rapid seat wear, even though it is constructed from a hard, wear resistant material.

Devices including a capillary-like tube several feet long and arranged to provide a torturous flow path have been used for this purpose. However, such devices can not be conveniently cleaned in the event the tube becomes plugged with foreign particles and the pressure reduction can not be adjusted.

Pressure reducing elements including a stepped cylindrical valve rod disposed in a small tube and axially movable therein to adjust the flow area between the tube bore and the valve rod have been used for this purpose. In the event such an element becomes plugged with foreign solid particles, such as rust, it usually is necessary to shut off the sample flow and remove the valve rod for cleaning.

This problem can be alleviated by using a double rod and tube arrangement such as that disclosed in Sentry Equipment Corp. Bulletin 1.10.1 RO 5-79, copy of which is enclosed. In such an arrangement, the high pressure fluid enters one tube, flows past the valve rod therein, makes a U-turn, flows past the valve rod in the other tube, and finally exits from the other tube. The valve rods are connected to a spindle which can be rotated by an external knob to retract the rods, without shutting off the sample flow, to a position where the system pressure can "blow" or flush the foreign particles out the exit tube. The external knob is also used for adjusting the pressure reduction provided by the element. Consequently, each time the rods are retracted to flush out plugging foreign particles, it is necessary to re-adjust them to the desired pressure reducing position and this task can be quite time consuming. Also, such a device and the other type devices discussed above have a relatively large internal flow volume which can be disadvantageous when used with a fluid containing radioactive materials, such as steam from a nuclear power plant, because the amount of shielding required to meet saftey standards correspondingly increases with increases in internal flow volume.

Pressure reducing elements for sampling systems desirably should be capable of providing a minimum sample flow to the analyzer when the system being sampled is at full operating pressure and at a relatively low pressure such as after shutdown.

U.S. Pat. No. 4,099,703 discloses a self-cleaning needle valve including means for retracting the valve stem without affecting the flow adjustment position. However, a spring biasing the valve stem to an adjusted position is located inside the valve body where it can be exposed to the fluid being sampled. Also, only a small portion of the valve stem normally exposed to the fluid sample can be retracted from the valve body. Consequently, it cannot be retracted for convenient inspection and cleaning.

Representative prior valve arrangements including a stepped bore or a stepped valve stem are disclosed in U.S. Pat. Nos. 2,725,212 (Jensen), 2,790,463 (Delano et al.) and 3,365,166 (Smith).

SUMMARY OF THE INVENTION

One of the principal objects of the invention is to provide a variable pressure reducing element for high pressure fluids including an elongated valve rod which can be rapidly retracted to a wide open position so that foreign particles can be flushed through the element by system pressure without affecting the pressure setting of the valve rod.

Another object of the invention is to provide such a variable pressure reducing element which provides pressure reduction under laminar flow conditions and yet has a minimum internal volume exposed to the fluid.

A further object of the invention is to provide such a variable pressure reducing element in which all but a small portion of the valve rod can be conveniently retracted exteriorly of the body for cleaning and/or inspection without disassembly of the element.

A still further object of the invention is to provide a variable pressure reducing element for sampling systems capable of providing a predetermined minimum sample flow both at extremely high and relatively low inlet pressures.

Other objects, aspects and advantages of the invention will become apparent to those skilled in the art upon reviewing the following detailed description, the drawing and the appended claims.

The variable pressure reducing element provided by the invention includes an elongated body having an axially-extending, cylindrical bore which connects an inlet with an outlet and includes at least a smaller diameter portion near the inlet and a larger diameter portion downstream of the smaller bore portion and preferably a still larger diameter portion downstream of the larger diameter portion. An elongated, cylindrical valve rod is disposed in the bore for reciprocal axial movement and includes an outer end portion located exteriorly of the body and a pressure regulating portion normally located in the bore. The pressure regulating portion includes a smaller diameter pressure regulating section and a larger diameter pressure regulating section downstream of the smaller diameter section.

The valve rod is moved between a maximum pressure reducing position wherein both pressure regulating sections are located in the smaller bore portion and a minimum pressure reducing position wherein only the smaller pressure reducing section is located in the larger bore portion by an adjustment means connected to the outer end of the valve rod and located exteriorly of the body. The valve rod is releasably held in an adjusted position by bias means which is located exteriorly of the body and associated with the adjustment means. The valve rod can be retracted against the force of the bias means to a wider open position, to permit foreign particles to be flushed from the element by system pressure, by actuating a retraction means located exteriorly of the body an operably connected to the adjustment means.

In a preferred embodiment, the adjustment means includes a fixture mounted on the body to permit relative axial or longitudinal movement and to prevent rotational movement relative to the longitudinal axis of the body and carrying a collar spaced outwardly from the outer end of the valve rod, a spindle connected to the outer end of the valve rod and threaded through the collar, and a handle on the outer end of the spindle for rotating the spindle. A compression spring encircling the exterior of the body, with one end bearing against the body and other end bearing against a spring retainer carried by the fixture, biases the valve rod in a direction toward the inlet. The valve rod can be retracted by pulling on the handle which causes the spring to compress and permits sufficient travel of the rod to move the second valve rod section into the next larger bore portion.

DESCRIPTION OF THE PREFERRED EMBODIMENTS

Figure 1:
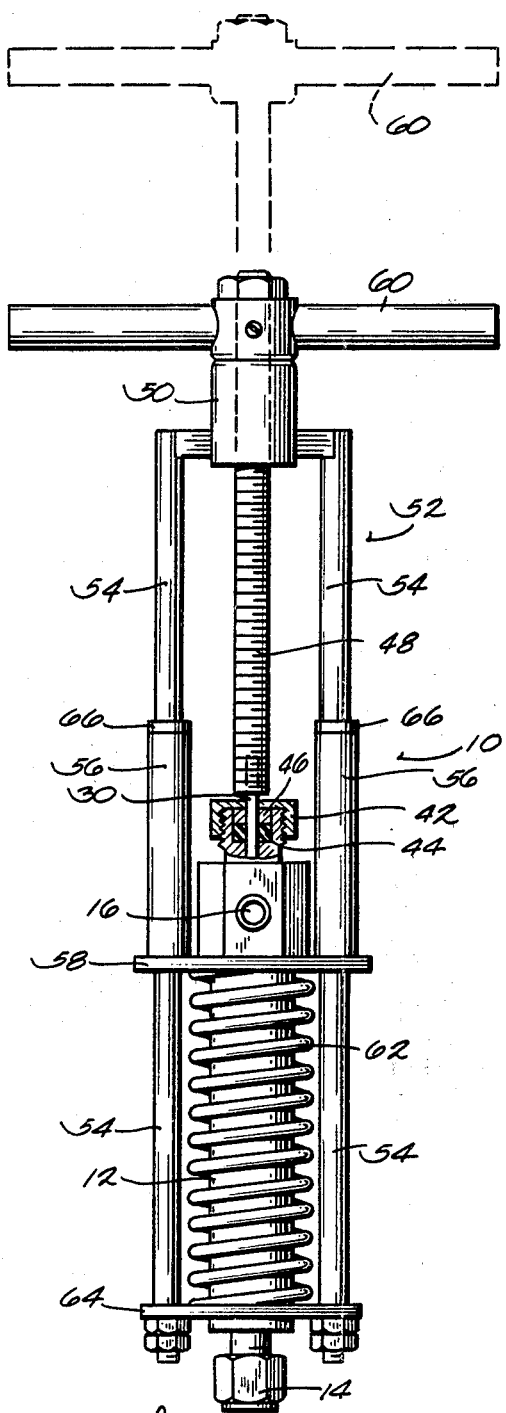
FIG. 1 is a side elevation, partially sectioned, view of a variable pressure reducing element incorporating various features of the invention.

Illustrated in the drawing is a variable pressure reducing element 10 adapted for use in a sampling system for a high pressure fluid, such as steam in a power plant. The pressure reducing element 10 includes an elongated body 12 having a sample inlet port 14 at one end, a sample outlet port 16 near the other end, and a stepped, cylindrical bore 18 extending through the body 12 and connecting the inlet port 14 in communication with the outlet port 16.

Figure 3:
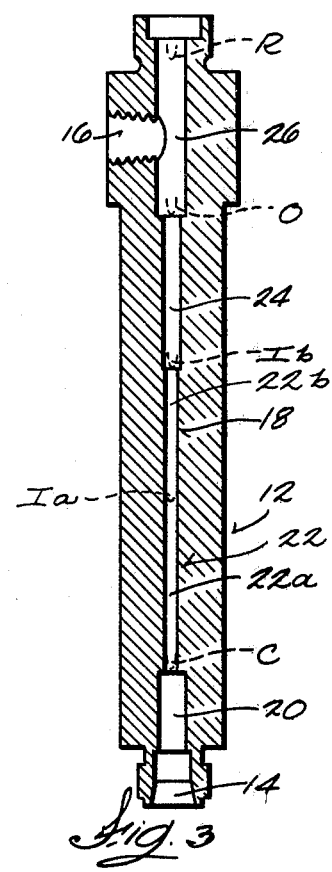
FIG. 3 is a cross sectional view of the body with all the other components removed.

As best shown in FIG. 3, the bore 18 has an enlarged inlet chamber 20, a first portion or step 22 adjacent the inlet chamber 20 having a substantially constant diameter, a second portion or step 24 downstream of the first step 22 having a substantially constant diameter slightly greater than that of the first step 22, and a third portion or step 26 downstream of the second step 24 opening into the outlet port 16 and having a substantially constant diameter somewhat larger than that of the second step 24. As explained in more detail below, the first two steps 22 and 24 provide pressure regulation for higher inlet pressures and the third step 26 provides pressure regulation at the substantially lower pressures.

Disposed in the bore 18 is an elongated, cylindrical, valve rod 28 including an outer end portion 30 located exteriorly of the body 12 and a stepped pressure regulating portion 32 normally located inside the bore 18. The pressure regulating portion 32 has a tapered, rounded inner end or tip 34, a first pressure regulating section or step 36 next to the tip 34 having a substantially constant diameter and a second pressure regulating section or step 38 downstream of the first pressure regulating section 36 and having a substantially constant diameter greater than that of the first valve rod 36. The first and second valve rod steps 36 and 38 preferably are connected by a frusto-conical section 40. The valve rod 28 extends through a packing retainer nut 42 which is threaded into the end of the body 12 and holds a packing ring 44, made of nylon or the like, in sealing engagement with the valve rod 28 via a packing follower disc 46.

Connected to the outer end portion 30 of the valve rod 28 is a threaded stem or spindle 48 which is threaded through a circular collar 50 on a fixture 52. The fixture 52 is mounted on the body 12 to permit axial or longitudinal movement of the fixture 52, and thus the collar 50, relative to the body 12, but to prevent rotational movement relative the longitudinal axis of the body 12. More specifically, the fixture 52 includes a pair of diametrically opposed rods 54 extending from the collar 50 and slidably received in a pair of diametrically opposed, stationary rod guides 56 carried by a mounting plate 58 affixed on the body 12.

Referring to FIG. 3, the valve rod 28 is movable between a maximum reducing position illustrated by the letter C and a minimum pressure reducing position illustrated by the letter O, through the immediate positions illustrated by the letters Ia and Ib. When the valve rod 28 is in position C, valve rod step 36 is located in bore step 22a and valve rod step 38 extends through bore steps 22b, 24 and 26. When in position C, the valve rod 28 is withdrawn to a location where only valve rod step 36 is located in the flow passage bore step 26. When the valve rod 28 is in intermediate position Ia, only valve rod step 36 is located in bore step 22a and valve rod step 38 extends through bore steps 24 and 26. When in intermediate position Ib, the valve rod 28 is completely withdrawn from bore step 22, valve step 36 is located in bore step 24 and valve rod step 38 is located in bore step 26.

The annular clearance between the first and second bore steps 22 and 24 and the first and second valve rod steps 36 and 38 are relatively small so as to provide pressure regulation for inlet pressures up to 3,000 psi and higher. As a guide, the differences between the diameters of the first bore step 22 and the second valve step 38, of the first bore step 22 and the first valve step 36, of the second bore step 24 and the second valve step 38, and of the second bore step 24 and the first valve step 36 can be 0.0010 in., 0.0020 in., 0.0088 in. and 0.0098 in. respectively. The annular clearance between the third bore step 26 and the first and second valve rod steps 36 and 38 are somewhat larger so that a predetermined minimum sample flow can be provided at relatively low inlet pressures, for example, an inlet pressure in the order of 50 psi after the system being sampled has been shut down. As a guide, the differences between the diameters of the third bore step 26 and the second valve step 3 and of the third bore step 26 and the first valve step 36 can be 0.0865 in. an 0.0875 in., respectively.

Adjustable movement of the valve rod 28 between maximum and minimum pressure reducing positions is accomplished by rotating a transversely extending handle 60 affixed on the outer end of the spindle 48. As viewed in FIG. 1, clockwise rotation of the spindle 48 moves the valve rod 28 toward the maximum pressure reducing position (downwardly) and counterclockwise rotation of the spindle 48 moves the valve rod 28 toward the minimum pressure reducing position (upwardly).

The valve rod 28 is biased toward an adjusted position (downwardly as viewed in FIG. 1) by a coiled, compression spring 62 encircling the body 12 with the one end bearing against the mounting plate 58 and the other end bearing against a spring retainer 64 carried on the outer ends of the rods 54. The rods 54 include stops 66 which engage the outer ends of the rod guides 56 to limit inward movement of the valve rod 28.

During operation, the valve rod 28 is set at a position which provides the desired pressure and flow rate of the sample through the outlet port 16. The relatively long flow passage defined between the bore 18 and the valve rod 28 produces a smooth pressure reduction, rather than discontinuous pressure reductions which can cause disassociation of components in the fluid sample.

Binding and possible damage by solid particles in the bore during movement of the valve rod 28 toward a maximum pressure reducing position is minimized by virtue of the valve rod 28 and the bore 18 being stepped instead of tapered. While a long tapered bore and a long tapered valve member could be used to provide the desired pressure reduction under laminar flow conditions, the fabrication costs for such components would be quite high. Furthermore, by providing steps on the valve rod and in the bore, rather than on the valve rod only, the internal volume of the element is minimized; a particularly important advantage when the element is exposed to a fluid which may contain radioactive materials as mentioned above.

In the event the flow passage through the element becomes obstructed by solid particles lodged between the valve rod 28 and the bore 18, the valve rod 28 can be retracted by pulling on the handle 60 (upwardly as viewed in FIG. 1) against the biasing force of the spring 62. The valve rod 28 and the spring 62 are arranged to permit sufficient travel of the valve rod 28 for the larger or second valve rod step 38 to be retracted into the next larger bore step or from the body when valve rod 28 is in the fully retracted position.

Figure 2:
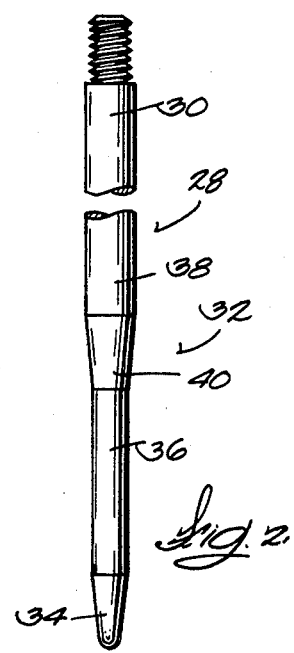
FIG. 2 is an enlarged, fragmentary elevational view of the valve rod.

That is, when the valve rod 28 is in the fully inserted or maximum pressure reducing position, the valve rod step 38 can be retracted into the second bore step 24. When the valve rod 28 is in an intermediate position with the second step 38 in second bore step 24, the second valve rod step 38 can be retracted into the third bore step 26. When the valve rod 28 is in the fully extended or minimum pressure reducing position, it can be retracted so that the tip 34 is completely removed from the flow path between the inlet and outlet ports 14 and 16 and only a small portion of the valve rod 28 extends into the outer end of the third bore step 26 as illustrated by position designated by the letter R in FIG. 2.

When the pulling force is released from the handle 60, the spring 62 returns the valve rod 28 to the adjusted position, i.e., the position it was in prior to retraction. Thus, the valve rod 28 can be quickly retracted to a position which creates a larger flow area, and rapidly moved back and forth several times if necessary, to assist in dislodging plugging particles and permitting them to be flushed out of the element by system pressure. Once this self-cleaning is accomplished, the valve rod 28 is automatically returned to the adjusted position by the spring 62. The tapered tip 34 serves to center the valve rod 28 in the second bore step 24 when the valve rod 28 has been retracted far enough for the tip 34 to be withdrawn into the third bore step 26.

Substantially the entire length of the valve 28 can be withdrawn from the body 12 for inspection and/or cleaning by rotating the handle 60 counterclockwise to move the spindle 48 as far upwardly as possible and then pulling on the handle 60. The valve rod 28 is then completely removed from the flow passage between the inlet and outlet ports 14 and 16 as mentioned above, thereby facilitating flushing of the bore 18. All but a small portion of the valve 28 (the inner end portion extending through the packing retainer 42 and the packing ring 46) is located outside the body 12 and is accessible for visual inspection and/or cleaning.

From the foregoing description, one skilled in the art can easily ascertain the essential characteristics of the invention and, without departing from the spirit scope thereof, make various changes and modifications to adapt it to various usages.

I claim:

1. A variable pressure reducing element comprising:
   an enlongated body having an inlet at one end, an outlet at the other end and an axially extending, cylindrical bore connecting said inlet with said outlet, said bore including at least a smaller diameter first portion near said inlet and a larger diameter second portion downstream of said first portion;
   an elongated, cylindrical valve rod disposed in said bore for reciprocal axial movement relative to said bore, said valve rod including an outer end portion located exteriorly of said body and a pressure regulating portion normally located in said bore and including a smaller diameter first section and a larger diameter second section downstream of said first section;
   means connected to the outer end of said valve rod and located exteriorly of said body for adjustably moving said valve rod between a maximum pressure reducing position wherein said first and second valve rod sections are located in said first bore portion and a minimum pressure reducing position wherein both said first and second valve rod sections are removed from said first bore portion;
   biasing means located wholly exteriorly of said body and associated with said adjustment means for releasably holding said valve rod in an adjusted position; and
   means located exteriorly of said body and associated with said adjustment means for retracting said valve rod against the biasing force of said biasing means a sufficient distance to move said second valve rod section into the next larger bore portion.

2. A variable pressure reducing element according to claim 1 wherein said valve rod, body and adjustment means are arranged to permit all but a small portion of said valve rod to be retracted from said body by operation of said retraction means after said valve rod has been moved to the minimum pressure reducing position.

3. A variable pressure reducing element according to claim 1 wherein said bore includes a third portion downstream of said second portion having a diameter larger than that of said second portion.

4. A variable pressure reducing element according to claim 1 wherein said adjustment means includes
   a fixture mounted on said body to prevent rotational movement thereof relative to the longitudinal axis of said body and carrying a collar spaced outwardly from the outer end of said valve rod;
   a threaded spindle connected to the outer end portion of said valve rod and threadably mounted in said collar to effect axial movement of said valve rod in response to rotation of said spindle; and means for rotating said spindle.

5. A variable pressure reducing element according to claim 4 wherein said spindle rotating means comprises a transversely extending handle on the outer end of said spindle.

6. A variable pressure reducing element according to claim 5 wherein
said retraction means includes means mounting said fixture on said body for axial movement of said fixture relative to said bore; and
said bias means is operatively connected to said fixture to urge said fixture in a direction toward said inlet, whereby said fixture, and thus said valve rod, can be retracted by pulling on said handle against the biasing force of said bias means in a direction away from said inlet.

7. A variable pressure reducing element according to claim 6 wherein
said fixture includes a pair of rods connected at one end to said collar and carrying a spring retainer on the opposite end;
said fixture mounting means comprises a pair of stationary rod guides mounted on said body and slidably receiving said rods; and
said bias means comprises a coiled, compression spring encircling said body with one end retrained against movement relative to said body and other end bearing against said spring retainer.

8. A variable pressure reducing element according to claim 1 wherein the inner end of said valve rod terminates in a tapered tip.

9. A variable pressure reducing element according to claim 1 wherein said first and second valve rod sections are connected together by a frusto-conical section.

10. A variable pressure reducing element comprising an elongated body having an inlet at one end, an outlet at the other end and an axially extending, cylindrical bore connecting said inlet with said outlet, said bore including a smaller diameter first portion near said inlet, a larger diameter second portion downstream of said first portion, and a still larger diameter third portion downstream of said second portion;
an elongated, cylindrical valve rod disposed in said bore for reciprocal axial movement relative to said bore, said valve rod including an outer end portion located exteriorly of said body and a pressure regulating portion normally located in said bore and including a smaller diameter first section and a larger diameter second section downstream of said first section;
a fixture mounted on said body to permit axial movement thereof relative to said body and to prevent rotational movement thereof relative to the longitudinal axis of said body and carrying a collar spaced outwardly from the outer end of said valve rod.
a threaded spindle connected to the outer end portion of said valve rod and threadably mounted in said collar to effect axial movement of said valve rod in response to rotation of said spindle and thereby adjustably move said valve rod between a maximum pressure reducing position wherein said first and second valve rod sections are located in said first bore section and a minimum pressure reducing position wherein said first valve rod section is located in said third bore portion;
a transversely extending handle on the outer end of said spindle; and
a coiled, compression spring encircling said body with one end restrained against movement relative to said body and the other end connected to said fixture for urging said fixture in a direction toward said inlet and thereby releasably holding said valve rod in an adjusted position, said spring and fixture being adapted to permit said valve rod to be retracted against the biasing force of said spring a sufficient distance to move said second valve rod section into the next larger bore portion by pulling on said handle.

11. A variable pressure reducing element according to claim 10 wherein
said fixture includes a pair of rods connected at one end to said collar and carrying a spring retainer on the opposite end;
said fixture mounting means comprises a pair of stationary rod guides mounted on said body and slidably receiving said rods; and
said other end of said spring bears against said spring retainer.

* * * * *